United States Patent [19]

Andersen et al.

[11] Patent Number: 5,139,612
[45] Date of Patent: Aug. 18, 1992

[54] SPRAY DRYING APPARATUS

[75] Inventors: Mogens Andersen, Kolding; Leo S. Christensson, Almind; Otto Hulshof, Kolding, all of Denmark

[73] Assignee: Damrow Company, Inc., Fond du Lac, Wis.

[21] Appl. No.: 656,066
[22] PCT Filed: Sep. 1, 1989
[86] PCT No.: PCT/DK89/00203
§ 371 Date: Feb. 28, 1991
§ 102(e) Date: Feb. 28, 1991
[87] PCT Pub. No.: WO90/02914
PCT Pub. Date: Mar. 22, 1990

[30] Foreign Application Priority Data

Sep. 2, 1988 [DK] Denmark ............................ 4896/88

[51] Int. Cl.$^5$ ................................................ B01D 1/18
[52] U.S. Cl. .................................... 159/4.01; 34/10; 34/57 A; 34/57 D; 34/57 R; 159/16.1; 159/43.1; 159/48.1; 159/DIG. 16; 202/205; 202/236; 203/90; 203/91
[58] Field of Search ................. 159/4.01, 16.1, 48.1, 159/43.1, DIG. 16; 203/90, 91, 2, 205, 236, 160; 34/10, 57 A, 57 D, 57 R

[56] References Cited

U.S. PATENT DOCUMENTS

| | | | |
|---|---|---|---|
| 2,387,458 | 10/1945 | Mojonnier | 159/4.01 |
| 3,331,306 | 7/1967 | Hutton et al. | 159/4.01 |
| 3,596,699 | 8/1971 | Okada | 159/4 |
| 3,615,723 | 10/1971 | Meade | 99/206 |
| 3,740,865 | 6/1973 | Laguilharre | 159/4.01 |
| 3,741,273 | 6/1973 | Meade | 159/4 |
| 3,895,994 | 7/1975 | Saguchi et al. | 159/4.01 |
| 3,969,546 | 7/1976 | Saeman | 423/474 |
| 4,006,204 | 4/1991 | Vensen | 159/48.1 |
| 4,012,846 | 3/1977 | Silva | 159/4.01 |
| 4,048,351 | 9/1977 | Saeman et al. | 423/474 |
| 4,112,130 | 9/1978 | Gupta | 426/599 |
| 4,293,524 | 10/1981 | Teller et al. | 159/4.01 |
| 4,571,311 | 2/1986 | Ferguson, Jr. et al. | 159/4.01 |

FOREIGN PATENT DOCUMENTS

| | | | |
|---|---|---|---|
| 8909372 | 10/1989 | PCT Int'l Appl. | 159/4.01 |
| 1312878 | 4/1973 | United Kingdom | 159/4.01 |

Primary Examiner—Virginia Manoharan
Attorney, Agent, or Firm—Andrus, Sceales, Starke & Sawall

[57] ABSTRACT

Liquids containing solid materials in soluble or suspended form are atomized in a chamber while admitting a drying gas. Partially dried particles settle to the bottom of the chamber and are collected on a perforated conveyor belt where they are subject to a final drying in order to obtain a homogeneous porous layer while drawing drying gas through the layer. The generation of a whirling movement in the lower part of the chamber immediately over the part of the conveyor belt where the particles settle ensures an even distribution of the particles while forming a layer of a constant thickness on the conveyor belt.

5 Claims, 4 Drawing Sheets

SPRAY DRYING APPARATUS

BACKGROUND OF THE INVENTION

The present invention relates to a spray drying apparatus for drying liquids containing solid materials in soluble or suspended form.

U.S. Pat. Nos. 3,615,723 and 3,741,273 disclose a spray drying apparatus comprising a drying tower, atomizing devices placed in the upper part of the drying chamber for comminuting the liquid to be dried into droplets, devices for introducing heated drying gas into the upper part of the drying chamber directed towards the droplets, a movable perforated surface placed under the lower end of the drying tower for collecting partially dried particles of solid material, devices for sucking gas together with suspended partially dried solid particles from the drying tower through the movable perforated surface while the particles or a substantial part of the particles settle on the movable perforated surface as an agglomerated porous layer of material, and devices for finish drying the agglomerated, porous layer of material while the perforated surface is moved forwards. The atomizing devices may comprise a number of downwardly directed nozzles for forming liquid droplets which together with a laminar stream of drying gas are conducted down through the chamber. A rotary disc may instead be used for atomizing the liquid. The drying gas may also be used as a turbulent gas stream passing downwards or circulating in the chamber. The partially dried particles will agglomerate and settle as a layer on the movable perforated surface which can be a conveyor belt made of wire netting or woven filter mat.

A drying apparatus of this kind is suitable for drying sensitive and easily decomposable materials, such as foodstuffs and pharmaceuticals since the drying temperature is low.

In order to make such an apparatus operate satisfactorily the layer of particles on the conveyor belt may advantageously be formed as a stable product with an open structure and an even thickness in the transverse direction, which necessitates an even distribution of the particles when settling. This is an aim which is hard to achieve, especially when using large or cylindrical drying chambers, in which case the layer in principle (when using a laminar gas stream) will be thickest in the middle with a decreasing thickness towards the edge of the conveyor belt, even if the belt covers the entire bottom of the chamber. Even if several atomizing nozzles are uniformly distributed in the upper part of the drying tower so that the partially dried particles get uniformly distributed in the drying gas and the suspension forms a laminar downward stream, the thickness of the settled layer will vary anyway.

If a rotary disc placed in the upper central part of the drying tower is used as atomizing device the particles will be hurled towards the walls of the chamber, and thus a thicker layer will be formed in the outer zones of the conveyor belt than in the central zone, and formation of an agglomerated uniform powder structure will not be achieved.

In order to overcome this disadvantage and obtain a layer of particles of uniform thickness on the conveyor belt, it has been proposed to provide a turbulent bustle zone between the chamber and the conveyor belt, cf. (DK patent application No. 1583/88 (Mar. 23, 1988)). This solution more or less solves the problem of creating a layer of settled particles with an even thickness in the transverse direction on the conveyor belt. It is, however, disadvantageous that the particles, due to a relatively high gas velocity and because of introduced supplementary process air, settle as a compact layer which will cause great resistance to gas penetration, result in decreased drying velocity and increase the risk of blocking the mat and the supporting movable perforated surface.

SUMMARY OF THE INVENTION

It is the object of the present invention to avoid the above-mentioned disadvantages, form a layer of even thickness and high porosity on the conveyor belt or a similar perforated surface and increase the versatility of the drying apparatus.

The apparatus according to the invention comprises a drying tower, the lower part of which is equipped with or connected to a bustle chamber comprising devices for controlling the amount and/or the distribution of gas sucked through the perforated surface. The surface is preferably continuously or intermittently movable along the bottom of the drying tower. The perforated surface can also be made of wire netting or filter mat covering the bottom of the drying tower. During operation, the net or the filter mat may move when the layer of agglomerated particles has reached the desired thickness. In this embodiment, the apparatus can instead be equipped with devices for intermittent removal of the powder settled on the net or filter mat.

The tower is preferably an elongated downwardly open cylinder. According to a preferred embodiment, the bustle construction comprises a shell surrounding the lower end of the drying tower and being connected to the tower, the chamber being connected to suction devices for removing a fraction of the drying gas from the lower end of the drying tower and possibly also being provided with blowing devices for introducing a gas into the lower end of the tower at certain locations. This arrangement makes it possible to control the stream of air directed towards the conveyor belt, so that a loose and porous layer with preferred uniform distribution will be formed. Due to its high porosity, the layer of particles will give less resistance to penetration of air, and the finish drying step will therefore be easier, uniform and faster. It is also possible to adjust the air distribution in such a way that an even thickness will be achieved.

By blowing in secondary gas through openings in the chamber wall it is further possible to achieve a desired control of the wall temperature on the inner side of the chamber wall, which entails significant advantages when drying temperature sensitive products, absorbent products, or when drying is performed under conditions close to dew point. The amount of blown in gas can in certain process situations constitute a minor amount of the total amount of drying air and can be contained in the amount of air being sucked out through the shell space, while in other situations it may entail an excess of air which is partly sucked out through the perforated surface under the product mat.

Secondary gas may also be introduced into the chamber from above, e.g. through concentric ducts.

While the devices for controlling the amount and/or distribution of the gas sucked through the movable perforated surface normally only consist of suction devices, it is sometimes appropriate at certain locations also to add blowing devices, if suitable for balancing the pressure difference between the two sides of the movable perforated surface and possibly for removing particles from the said locations.

According to a preferred embodiment of the invention the devices for controlling the amount and/or distribution of the gas which later is to be sucked through the movable perforated surface, comprise several minor openings placed at the circumference of the bustle chamber and connected to individually adjustable suction and/or blowing devices. The individual adjustment of the air stream at different locations makes it possible to ensure a very even thickness of the layer of particles on the conveyor belt.

The bustle construction may advantageously be a transition unit, the lower end of which having a rectangular cross-section adjacent to the conveyor belt and substantially the same width as the conveyor belt.

According to another preferred embodiment of the invention, the bustle construction is connected to a chamber surrounding the conveyor belt and comprising several compartments placed under the belt, each compartment having means for individual adjustment of the pressure difference over the section in question of the conveyor belt. This arrangement serves the purpose of further ensuring an even thickness in the transverse direction of the layer of particles settled on the conveyor belt.

BRIEF DESCRIPTION OF THE DRAWINGS

The invention shall be illustrated in more detail in the following, reference being made to the drawing where.

DESCRIPTION OF THE PREFERRED EMBODIMENTS

Figure 1:
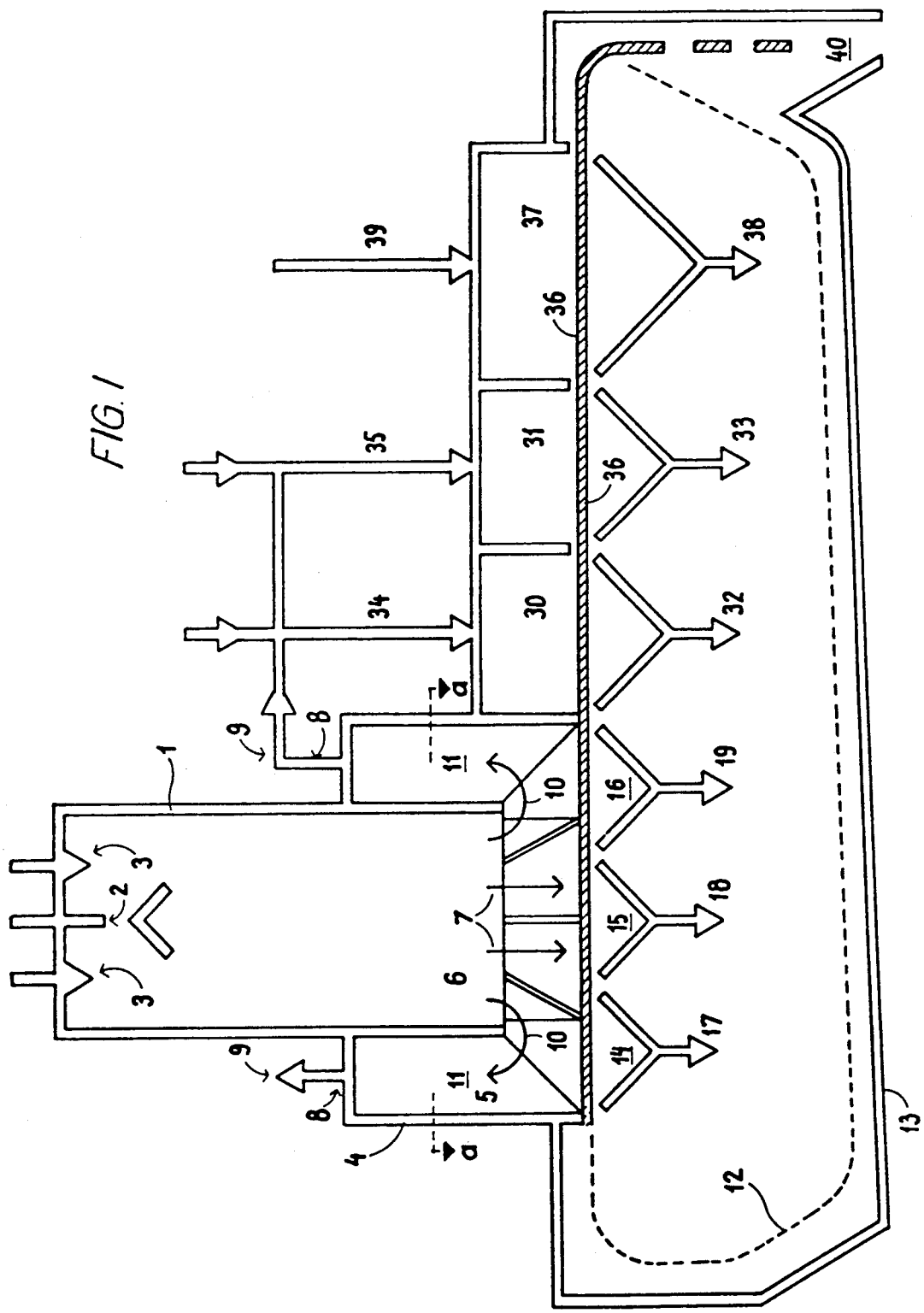
FIG. 1 shows a preferred embodiment of the apparatus according to the invention.
Figure 2:
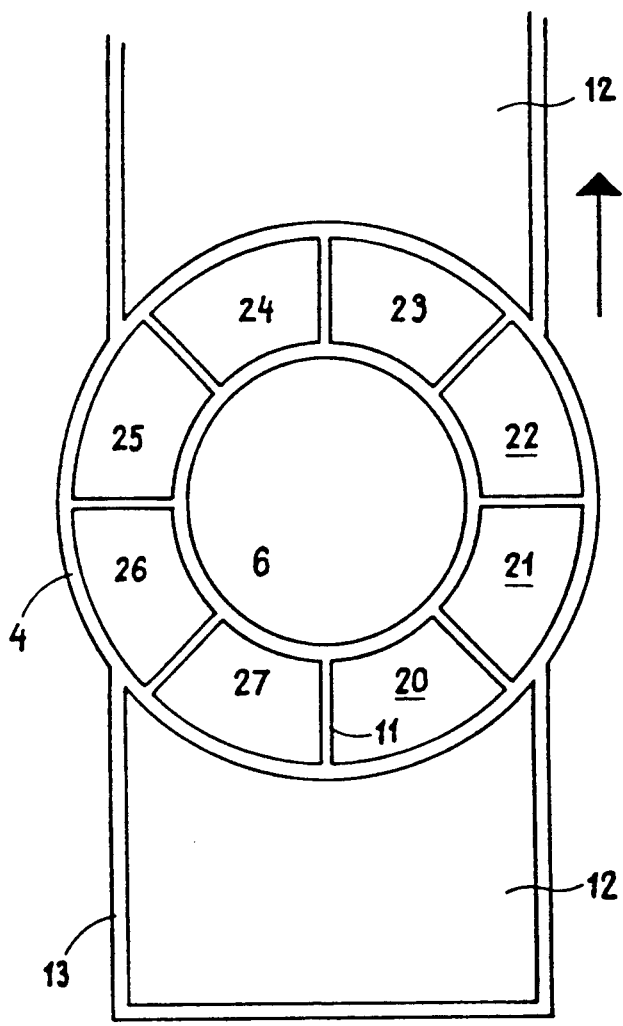
FIG. 2 shows a section of the bustle construction taken along the line a—a.

The apparatus shown in FIG. 1 comprises a vertical cylindrical drying chamber 1, atomizing devices 2, placed in the upper part of the drying tower, inlet tubes 3,3 for heated drying gas. The bustle construction 4 surrounds the lower end of the drying tower. The interior 5 of the bustle chamber communicates with the interior 6 of the lower end of the drying tower. The drying air with suspended droplets passes downwards, illustrated by arrows 7. Air from the bustle construction 4 is sucked out through 8,8, the stream being adjusted by means of valves 9,9 so that a part of the drying gas passes from the lower end of the drying chamber into the bustle construction in the direction of the arrows 10,10 and out through the tubes 8,8. The entire conveyor belt 12 is contained in the chamber 13, and a number of compartments 14, 15, 16 connected to individually adjustable suction devices 17, 18, 19, is placed in the chamber 13 under the conveyor belt 12. The interior of the bustle chamber is divided into several compartments 20, 21, 22, 23, 24, 25, 26 and 27, as better seen in FIG. 2, the compartments being separated by partition walls 11.

The conveyor belt 12 passes through two compartments 30, 31, connected to suction devices 32, 33 and to inlet tubes for supplementary drying gas. The agglomerated layer 36 of particles is finish dried in these compartments. Further, the conveyor belt with the dried layer of particles passes through another chamber 37 to which are connected suction devices 38 and an inlet tube 39 for cooling gas.

The layer of dried particles is disintegrated at the end of the conveyor belt and collected through a funnel-shaped outlet opening 40.

Figure 3:
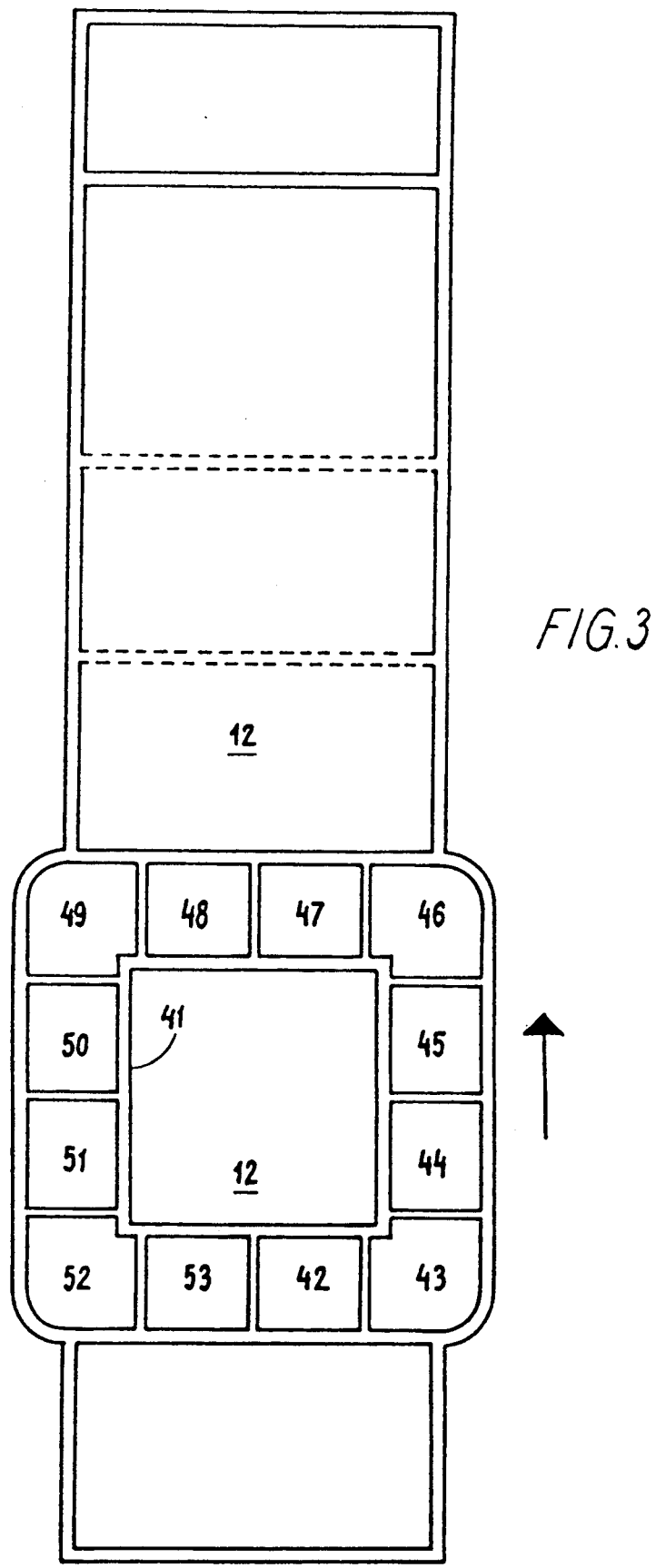
FIG. 3 shows a section of the bustle construction formed as a transition unit having a rectangular cross-section adjacent to the conveyor belt.

FIG. 3 shows a section of a bustle construction formed as a transition unit with a rectangular cross-section 41 connected to the conveyor belt 12. The bustle construction is divided into several compartments 42, 43, 44, 45, 46, 47, 48, 49, 50, 51, 52 and 53, being connected to devices (not shown) for individual control of the pressure in each compartment.

Secondary air containing gaseous, liquid or powdery materials or additives, such as aroma substances or anti-caking substances, etc., may through one or more of the compartments be added to the material on the belt. Gaseous additives may also be added through one or more of the compartments 14, 15 under the conveyor belt.

Figure 4:
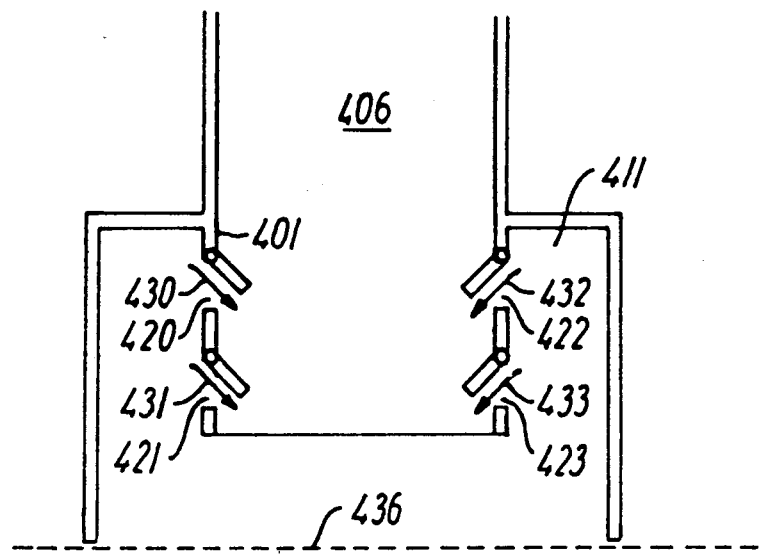
FIG. 4 shows a cross-section of a bustle construction with devices for blowing secondary air into the lower part of a drying chamber.

The bustle construction shown in FIG. 4 comprises a shell 411 surrounding the lower part of a drying chamber 406. The wall 401 of the drying chamber is provided with a number of openings 420, 421, 322, 423 through which secondary gas can be introduced into the chamber 406 in the direction of the arrows 430, 431, 432, 433 from the shell 411. Hereby secondary drying gas can be introduced, which prevents settlement of dried particles along the chamber wall and at the same time ensures a more even distribution of the dried particles which settle on a perforated bottom 436, which may be stationary or a movable conveyor belt.

Figure 5:
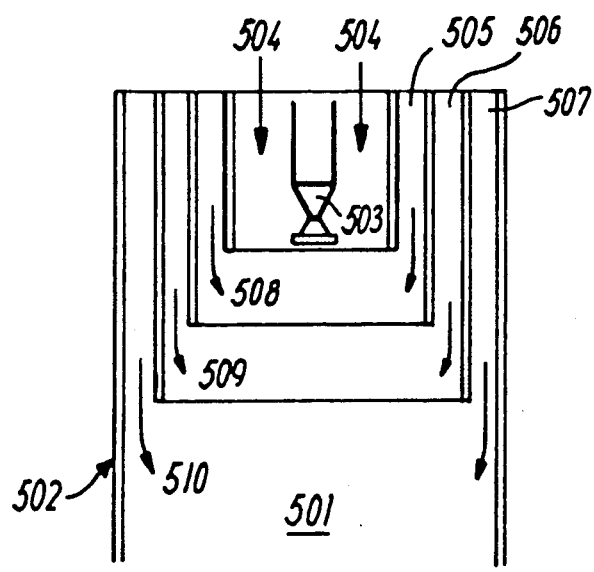
FIG. 5 shows an embodiment in which secondary gas is introduced from above through concentric ducts along the chamber wall.

A similar effect can be achieved by the embodiment shown in FIG. 5. The figure is a cross-section of the upper part of a spraying plant comprising a chamber 501 with a chamber wall 502. A number of cylindrical partition walls project from above to form ducts 505, 506, 507, ending at different hights in the chamber. An atomizing unit 503 with an atomizing disc is placed centrally at the top of the chamber. The gas flow for drying air is shown by the arrow 504. Varying amounts of secondary drying air, shown by the arrows 508, 509, 510, can be introduced through the ducts 505, 506, 507. By controlling the amounts of drying air in the ducts it is possible to achieve a better distribution of the dried material and prevent material from settling along the chamber wall.

We claim:

1. A spray drying apparatus for drying liquids containing solid material in dissolved or suspended form, comprising:

a drying tower (1) having an opening (6) at the lower end, atomizing means (2) disposed in the upper portion of the drying tower for comminuting the liquid to be dried into droplets, means (3) for introducing a heated drying gas into the upper portion of the drying tower directed toward the droplets, a movable perforated conveyor belt (12) disposed beneath the opening at the lower end of the drying tower for collecting partially dried particles of solid material, means (17, 18, 19) for drawing gas with suspended partially dried solid particles from the drying tower through the perforated conveyor belt to cause particles to settle on the perforated conveyor belt as an agglomerated porous layer of materials, means (32, 33, 38) for drying said agglomerated porous layer of material, a bustle construction (4) connected to the drying tower for obtaining uniform distribution of the particles to be dried on the perforated conveyor belt (12), said bustle construction including a chamber (11) surrounding the lower end of the drying tower (1) and communicating with the tower, said chamber being connected to said means for drawing gas (17, 18, 19) for removing a fraction of the drying gas from the lower end of the drying tower (1), blower means (420, 421, 422, 423) for introducing a gas into the lower end of the tower at a plurality of selected locations, said means for drawing gas (17, 18, 19) and said blower means (420, 421, 422, 423) being individually adjustable, and a housing (13) connected to said bustle construction and surrounding the conveyor belt, said housing comprising a plurality of compartments (14, 15, 16) disposed beneath the conveyor belt (12), each compartment having means for individual adjustment of the pressure difference over the adjacent section of the conveyor belt.

2. The apparatus according to claim 1, wherein the drying tower (1) is an elongated downwardly open cylinder.

3. The apparatus according to claim 1, wherein the means for drawing gas (17, 18, 19) includes a plurality of openings (20-27) disposed at the periphery of the bustle construction.

4. The apparatus according to claim 1, wherein the lower end of the bustle construction has a generally rectangular cross-section and is disposed adjacent to the conveyor belt (12) and has substantially the same width as the conveyor belt.

5. The apparatus according to claim 1, wherein a pair of openings (20-27) are located along a line normal to the direction of movement of the conveyor belt (12) and are connected to means for drawing gas (17, 18, 19) and a second pair of said openings are located along a second line parallel to the direction of movement of said belt and are connected to blower means (420, 421, 422, 423).

* * * * *